United States Patent
Bourdev et al.

(10) Patent No.: US 7,768,516 B1
(45) Date of Patent: Aug. 3, 2010

(54) IMAGE SPLITTING TO USE MULTIPLE EXECUTION CHANNELS OF A GRAPHICS PROCESSOR TO PERFORM AN OPERATION ON SINGLE-CHANNEL INPUT

(75) Inventors: Lubomir Bourdev, San Jose, CA (US); Jonathan Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 873 days.

(21) Appl. No.: 11/581,966

(22) Filed: Oct. 16, 2006

(51) Int. Cl.
*G06F 15/00* (2006.01)
*G06F 9/46* (2006.01)
*G06T 1/00* (2006.01)

(52) U.S. Cl. .................... 345/501; 718/105
(58) Field of Classification Search .......... 345/501, 345/503, 679, 680; 718/105
See application file for complete search history.

(56) References Cited

U.S. PATENT DOCUMENTS

| | | | | |
|---|---|---|---|---|
| 4,700,320 A * | 10/1987 | Kapur | .................. | 715/807 |
| 4,805,127 A * | 2/1989 | Hata et al. | .................. | 345/441 |
| 5,493,643 A * | 2/1996 | Soderberg et al. | .................. | 345/505 |
| 5,917,940 A * | 6/1999 | Okajima et al. | .................. | 382/173 |
| 6,108,007 A * | 8/2000 | Shochet | .................. | 345/586 |
| 6,157,747 A * | 12/2000 | Szeliski et al. | .................. | 382/284 |
| 6,469,746 B1 * | 10/2002 | Maida | .................. | 348/564 |
| 6,747,654 B1 * | 6/2004 | Laksono et al. | .................. | 345/502 |
| 2002/0145612 A1 * | 10/2002 | Blythe et al. | .................. | 345/581 |
| 2003/0128216 A1 * | 7/2003 | Walls et al. | .................. | 345/506 |
| 2003/0169269 A1 * | 9/2003 | Sasaki et al. | .................. | 345/581 |
| 2004/0189650 A1 * | 9/2004 | Deering | .................. | 345/506 |
| 2005/0041031 A1 * | 2/2005 | Diard | .................. | 345/505 |

OTHER PUBLICATIONS

Hall, et al, "Cache and Bandwidth Aware Matrix Multiplication on the GPU," Tech Report UIUCDCS-R-2003-2328, University of Illinois Dept. of Computer Science, Mar. 2003.
Carr, et al, "Rectangular Multi-Chart Geometry Images," ACM International Conference Proceeding Series; vol. 256, Proceedings of the Fourth Eurographics Symposium on Geometry Processing, Cagliari, Sardinia, Italy, pp. 181-190, 2006, Jun. 28, 2006.

(Continued)

*Primary Examiner*—Kee M Tung
*Assistant Examiner*—Robert Craddock
(74) *Attorney, Agent, or Firm*—Robert C Kowert; Meyertons, Hood, Kivlin, Kowert & Goetzel, P.C.

(57) ABSTRACT

A method, system, and computer-readable storage medium are disclosed for performing an operation on single-channel input using a plurality of execution channels of a graphics processing unit (GPU). A single-channel input may be divided into a plurality of sub-inputs, wherein each of the plurality of sub-inputs comprises a portion of the single-channel input. Borders between the sub-inputs may overlap. Program instructions may be executed on the GPU to perform the operation. At least a subset of the program instructions may be executed on each of the plurality of execution channels in parallel for a corresponding one of the plurality of sub-inputs. In one embodiment, the single-channel input may comprise a single-channel input image for an image-processing operation. In one embodiment, the GPU may comprise four execution channels.

29 Claims, 8 Drawing Sheets

OTHER PUBLICATIONS

Goodnight, et al, "Interactive Time-Dependent Tone Mapping Using Programmable Graphics Hardware,"rnational Conference on Computer Graphics and Interactive Techniques, ACM SIGGRAPH 2005 Courses, Los Angeles, California, 2005, Aug. 4, 2005.

* cited by examiner

| | | Input 122 | | |
|---|---|---|---|---|
| Sub-Input 1 123A | Sub-Input 2 123B | Sub-Input 3 123C | Sub-Input 4 123D | Sub-Input 1 123A |
| Sub-Input 2 123B | Sub-Input 3 123C | Sub-Input 4 123D | Sub-Input 1 123A | Sub-Input 2 123B |
| Sub-Input 3 123C | Sub-Input 4 123D | Sub-Input 1 123A | Sub-Input 2 123B | Sub-Input 3 123C |
| Sub-Input 4 123D | Sub-Input 1 123A | Sub-Input 2 123B | Sub-Input 3 123C | Sub-Input 4 123D |

Figure 6

| Input 122 | |
|---|---|
| Sub-Input 1 123A | Sub-Input 2 123B |
| Sub-Input 3 123C | Sub-Input 4 123D |

Figure 7

IMAGE SPLITTING TO USE MULTIPLE EXECUTION CHANNELS OF A GRAPHICS PROCESSOR TO PERFORM AN OPERATION ON SINGLE-CHANNEL INPUT

BACKGROUND

1. Field of the Invention

The present invention is directed to computer systems; and more particularly, it is directed to utilization of graphics processors associated with computer systems.

2. Description of the Related Art

As the power and complexity of personal computer systems increase, graphics operations are increasingly being performed by dedicated graphics rendering devices referred to as graphics processing units (GPUs). GPUs are often used in removable graphics cards which are coupled to a motherboard via a standardized bus (e.g., AGP or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may implement one or more application programmer interfaces (APIs) which permit programmers to invoke the functionality of the GPU.

Modern GPUs are typically implemented with a parallel structure. Accordingly, a GPU may include a plurality of execution channels (usually four) which can be used simultaneously to perform multi-channel operations. To take advantage of the parallel structure, a GPU may be configured to process multi-channel input. Multi-channel input may include vectorized data. Multi-channel input may include graphical data having a plurality of channels, such as separate channels for red, green, blue, and alpha data. Alternatively, the multi-channel data may include other types of vectorized data such as arrays of vertices, etc. The parallel structure of the GPU may permit efficient processing of multi-channel data by executing instructions on all of the data channels simultaneously.

Nevertheless, not all operations use vectorized input data. Single-channel operations use input and produce output having only one channel. When GPUs have been used to perform single-channel operations, only one execution channel has been used at any given time. When the GPU is used in this manner, the remaining execution channels may be left idle.

SUMMARY

Various embodiments of systems, methods, and computer-readable storage media for performing an operation on single-channel input using a plurality of execution channels of a graphics processing unit (GPU) are disclosed. According to one embodiment, a single-channel input image for an image-processing operation may be divided into a plurality of sub-inputs. Each of the plurality of sub-inputs may comprise a portion of the single-channel input image. For example, the input image may be divided into a plurality of rectangular sub-images or a plurality of sets of pixels. One or more borders of the sub-inputs may overlap. For example, a border of a first sub-input may comprise data that duplicates data on an adjacent border of a second sub-input. Program instructions may be executed on the GPU to perform the image-processing operation on the plurality of sub-inputs. At least a subset of the program instructions may be executed on each of the execution channels in parallel for a corresponding sub-input. In this manner, each portion of the single-channel input image may be processed in parallel using a GPU comprising a plurality of execution channels.

According to one embodiment, the GPU may be configured to receive a multi-channel input to utilize the plurality of execution channels. A multi-channel input may be generated from the sub-inputs. The multi-channel input may comprise each of the plurality of sub-inputs in a respective channel of the multi-channel input. The multi-channel input may also comprise an additional area for storing overlapping borders between the sub-inputs. In performing the operation at the GPU, each channel of the multi-channel input may be assigned to a corresponding one of the plurality of execution channels. In one embodiment, the GPU may comprise four execution channels, and the single-channel input may be divided into four sub-inputs (e.g., quadrants of a single-channel input image).

BRIEF DESCRIPTION OF THE DRAWINGS

FIG. 6 is a block diagram illustrating an embodiment in which the single-channel input is divided into discontinuous portions.

FIG. 7 is a block diagram illustrating an embodiment in which the single-channel input is divided into contiguous blocks.

Figure 1:
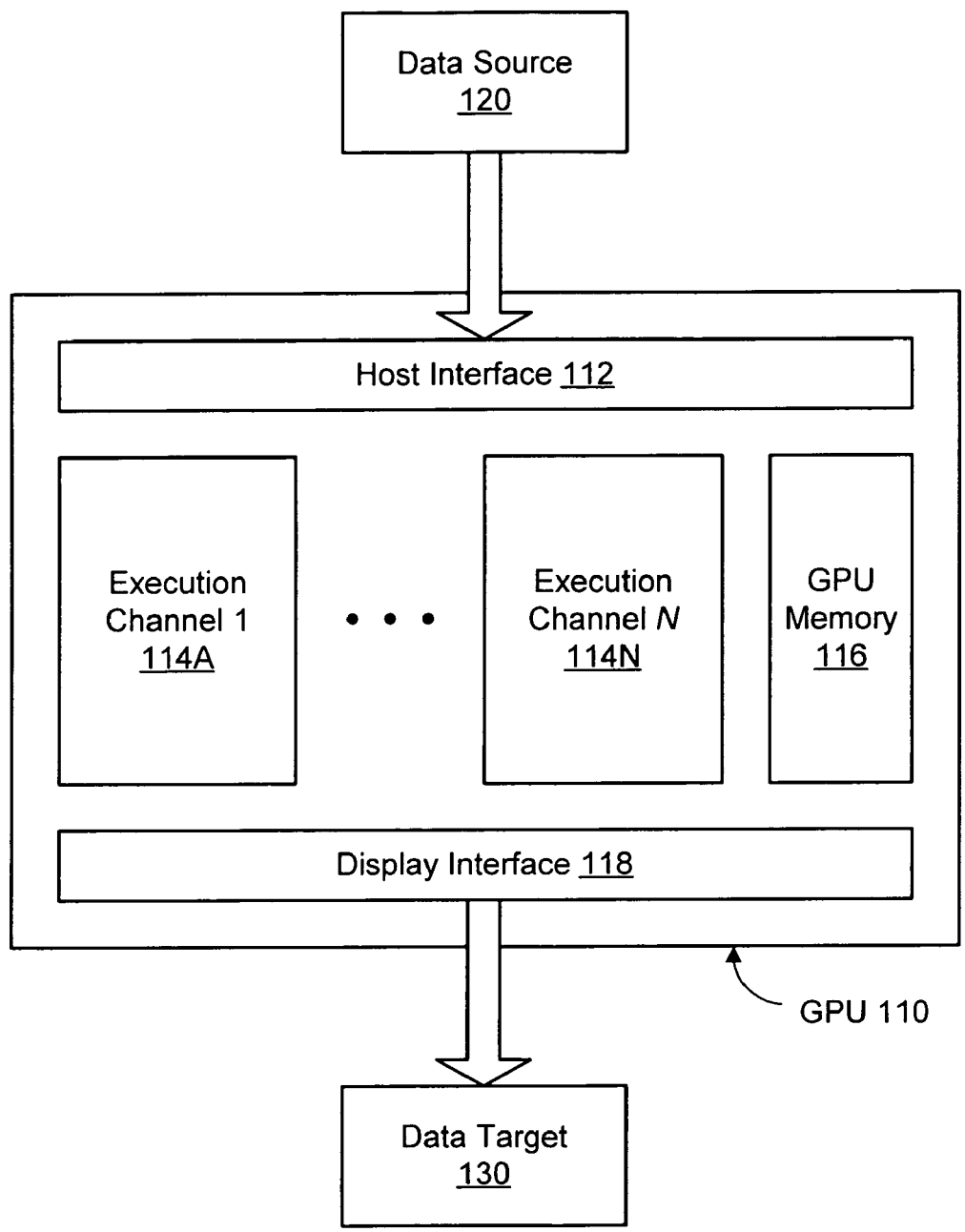
FIG. 1 is a block diagram illustrating one embodiment of a system configured to perform an operation on single-channel input using multiple execution channels of a GPU.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 9:
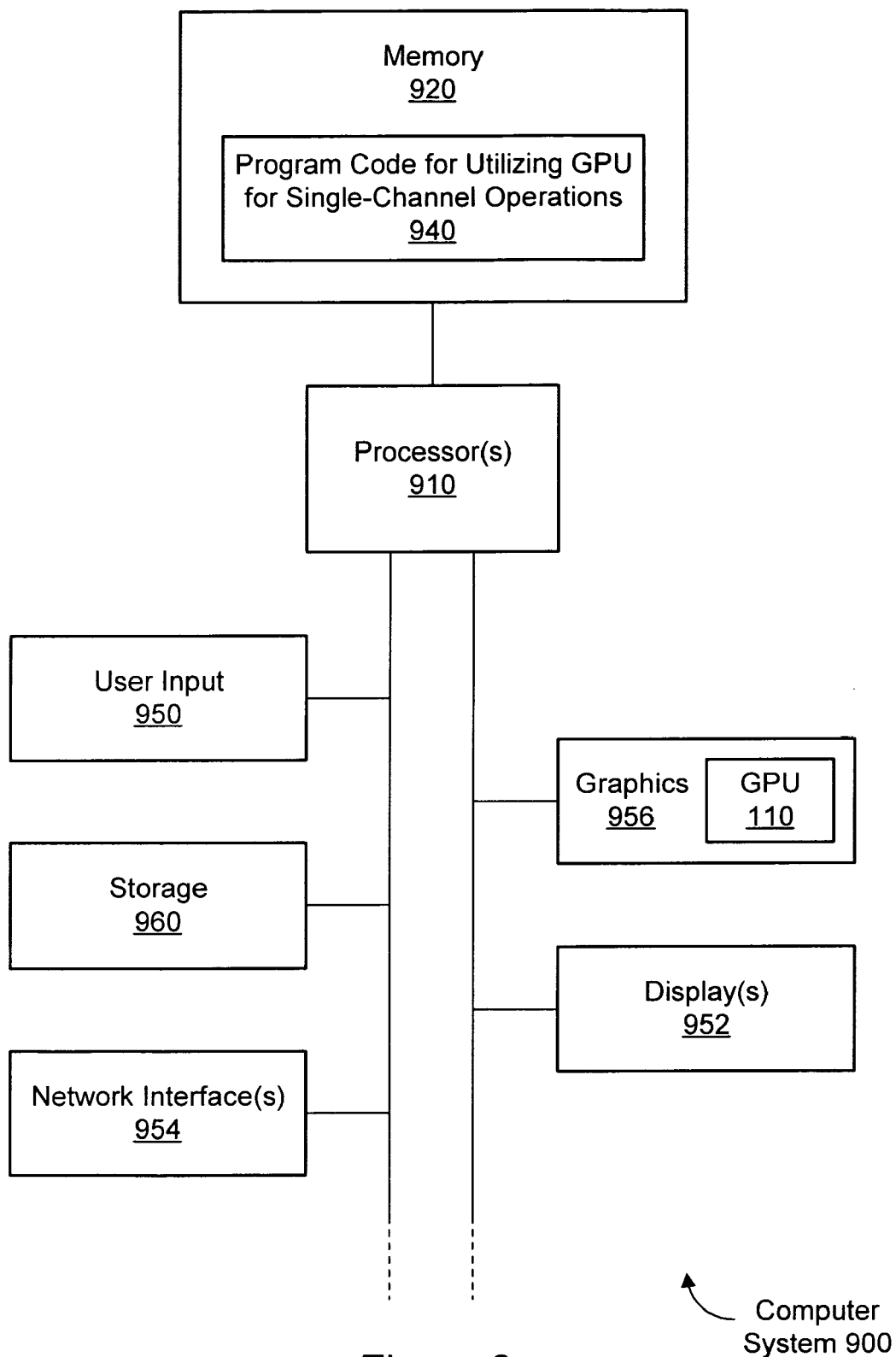
FIG. 9 is a block diagram illustrating constituent elements of a computer system which is configured to implement embodiments of the system and method for performing an operation on single-channel input using multiple execution channels of a GPU.

FIG. 1 is a block diagram illustrating one embodiment of a system configured to perform an operation on single-channel input using multiple execution channels of a GPU. A graphics processing unit (GPU) 110, also referred to herein as a graphics processor, may comprise a dedicated graphics rendering device associated with a computer system. An example of a suitable computer system 900 for use with a GPU 110 is illustrated in FIG. 9. Turning back to FIG. 1, a GPU 110 may include numerous specialized components configured to optimize the speed of rendering graphics output. For example, a GPU 110 may include specialized components for rendering three-dimensional structures, for applying textures to surfaces, etc. For the sake of illustration, however, only a limited selection of components are shown in the example GPU 110 of FIG. 1. It is contemplated that GPU architectures other than the example architecture of FIG. 1 may be suitable for implementing the techniques described herein. Suitable GPUs 110 may be commercially available from vendors such as NVIDIA Corporation, ATI Technologies, and others.

The GPU 110 may include a host interface 112 configured to communicate with a data source 120 (e.g., a communications bus and/or processor(s) 910 of a host computer system 900, or the host system itself). For example, the data source 120 may provide input data and/or executable program code to the GPU 110. In some embodiments, the host interface 112 may permit the movement of data in both directions between the GPU 110 and the data source 120. The GPU 110 may also include a display interface 118 for providing output data to a data target 130. For example, the data target 130 may comprise a display device 952, and the GPU 110 (along with other graphics components and/or interfaces 956) may "drive" the display 952 by providing graphics data at a particular rate from a frame buffer.

In one embodiment, the GPU 110 may include internal memory 116. The GPU memory 116 may comprise random-access memory (RAM) which is accessible to other GPU components. As will be described in greater detail below, the GPU memory 116 may be used in some embodiments to store various types of data and instructions such as input data, output data, intermediate data, program instructions for performing various tasks, etc. In one embodiment, the GPU 110 may also be configured to access memory 920 of a host computer system 900 via the host interface 112.

In one embodiment, the GPU 110 may include a plurality of execution channels 114A-114N as illustrated in FIG. 1. Using the plurality of execution channels 114A-114N, the GPU 110 may process a plurality of tasks in a substantially parallel manner, such that a plurality of the execution channels 114A-114N are simultaneously in use. Each of the execution channels 114A-114N may perform tasks independent of the other execution channels 114A-114N. The GPU 110 may be configured to process multi-channel input and produce multi-channel output. Multi-channel input may comprise vectorized input, and multi-channel output may comprise vectorized output. In one embodiment, the data in one channel of the multi-channel input may be processed by the GPU 110 independently of the data in the other channels. In one embodiment, the multi-channel input and multi-channel output may comprise graphical data having a plurality of channels. For example, the plurality of channels may represent RGBA data (data comprising separate channels for red, green, blue, and alpha data), vertices, textures, etc. The plurality of channels may comprise overlapping channels in a rectangular area of graphical data. In one embodiment, the number of the channels in the multi-channel input and multi-channel output may be equal to the number of execution channels in the GPU 110 for optimal parallel processing. In one embodiment, the GPU 110 may include additional components configured to control the plurality of execution channels 114A-114N, such as by distributing portions of the multi-channel input to individual execution channels. In this manner, the GPU 110 may perform operations on multi-channel input data.

In the prior art, the GPU 110 may also be configured to perform single-channel operations on single-channel data using only one of the plurality of execution channels 114A-114N. A single-channel operation may comprise an operation on non-vectorized input or input having only one channel (e.g., graphical data having only one channel). When the GPU 110 is used in this manner, however, the remaining execution channels may be idle. Using the systems and methods described herein, the plurality of execution channels 114A-114N of the GPU 110 may be used to perform single-channel operations. In this manner, the resources of the GPU 110 may be used to perform single-channel operations more efficiently.

As will be discussed in greater detail below, the non-vectorized input data for the single-channel operation may be divided into a plurality of sub-inputs which may then be processed in parallel using the GPU 110. Various techniques for dividing the input data into a plurality of sub-inputs are discussed with reference to FIGS. 6, 7, 8A, and 8B. Prior to the process of dividing it into sub-inputs, the input data for the single-channel operation may comprise only one channel or, alternatively, only one channel of interest to the GPU operation. For example, the single channel of interest to the operation may comprise a luminance map. Single-channel operations may include graphical operations on rectangular blocks of pixels, such as convolutions, pattern-recognition operations, other operations to determine a value of a pixel, etc. The single-channel graphical operations may comprise two-dimensional (2D) image-processing operations. Other single-channel operations may include general-purpose calculations on (i.e., GPGPU operations) on numerical or mathematical input such as solving partial differential equations, etc.

Figure 2:
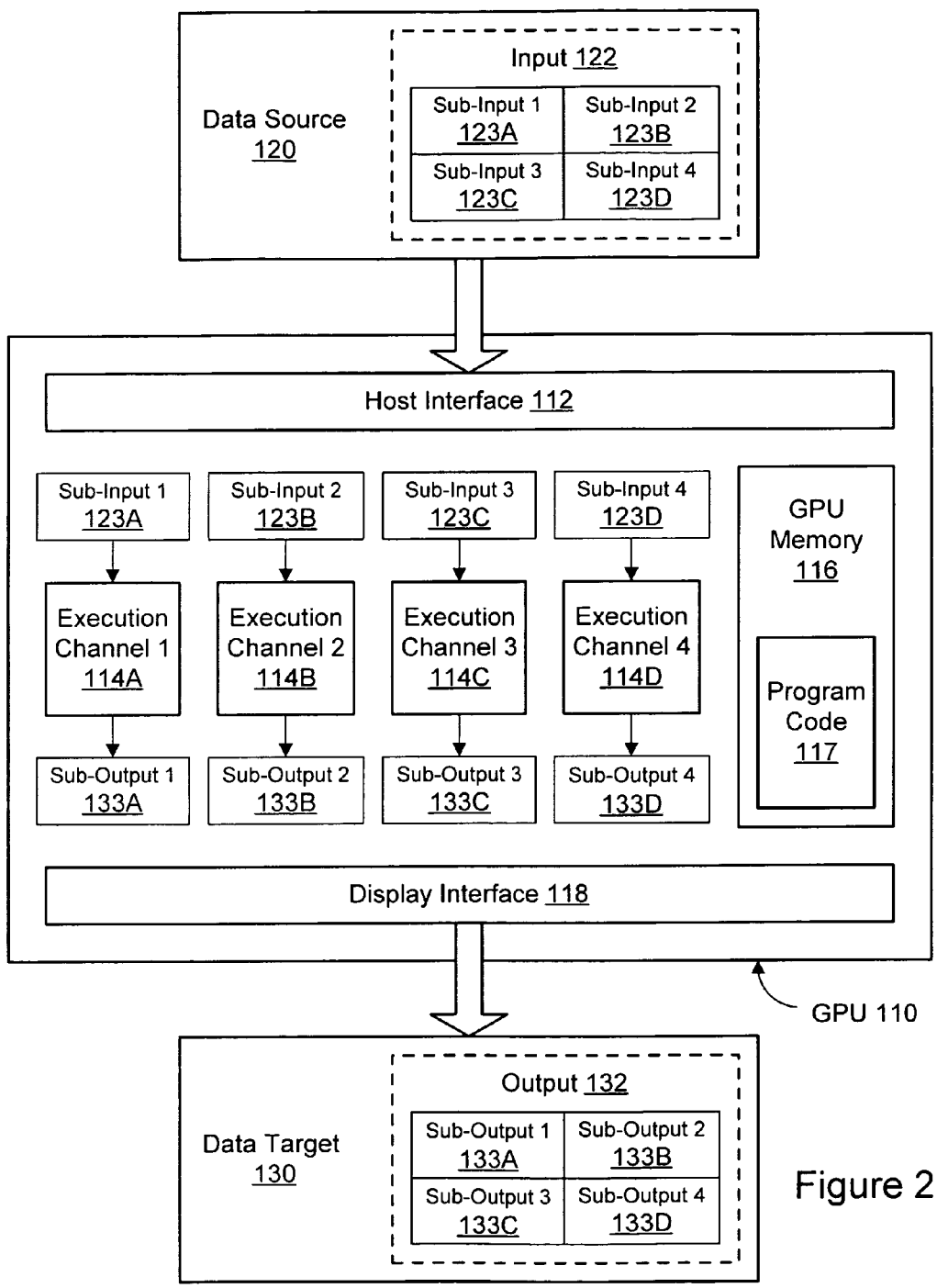
FIG. 2 is a block diagram illustrating one embodiment of a system configured to perform an operation on single-channel input using four execution channels of a GPU.

In one embodiment, the GPU 110 may comprise four execution channels. FIG. 2 is a block diagram illustrating one embodiment of a system configured to perform an operation on single-channel input using four execution channels 114A-114D of a GPU. Single-channel input 122 may be provided to the GPU 110 by a data source 120. Prior to being processed using the four execution channels 114A-114D of the GPU 110, the input 122 may be divided into four sub-inputs 123A-123D. For example, a rectangular input image may be divided into four rectangular sub-images, each having approximately one-fourth the area of the original input image. In various embodiments, the input 122 may be divided at the data source 120, at the GPU 110, or at an intermediate component.

To process the sub-inputs 123A-123D, program code 117 comprising instructions for performing the single-channel operation may be provided to the GPU 110. The program code may be stored in the GPU memory 116 and executed by each of the execution channels 114A-114D. In one embodiment, the program code 117 may be customized to apply the single-channel operation on four sub-inputs 123A-123D simultaneously. The program code 117 may be configured to fetch and process a plurality of channels of input data in a parallel manner. Image-processing operations implemented with suitable program code 117 may employ bilinear interpolation on a plurality of channels simultaneously.

In one embodiment, the program code 117 may comprise a pixel shader which is configured to determine a value of a particular pixel. To invoke the operation implemented by the pixel shader, a quad (i.e., two triangles) covering the result image is drawn. Input for the pixel shader may be represented as textures, coordinates, and/or uniform parameters. After processing the input, the result image may include the result of the computation.

Upon processing each of the sub-inputs using a respective execution channel executing the program code 117, four sub-outputs 133A-133D may be generated. In one embodiment, other results of the single-channel operation may be generated in addition to or instead of the four sub-outputs 133A-133D. For example, single-channel operations for pattern recognition or statistical analysis of an image may generate additional data. The four sub-outputs 133A-133D and/or other results may be provided to the data source 120 and/or data target 130 using the techniques discussed with reference to FIG. 1.

After performing the operation, the four sub-outputs 133A-133D may be combined to generate a final output 132. For example, four rectangular sub-images may be combined to generate a final image having approximately four times the area of each of the sub-outputs 133A-133D. The final output 132 may be received by a data target 130. In various embodiment, the sub-outputs 133A-133D may be combined at the GPU 110, at the data target 130, or at an intermediate component. In one embodiment, the sub-outputs 133A-133D may be combined by essentially reversing the steps used in subdividing the input 122.

Figure 3:
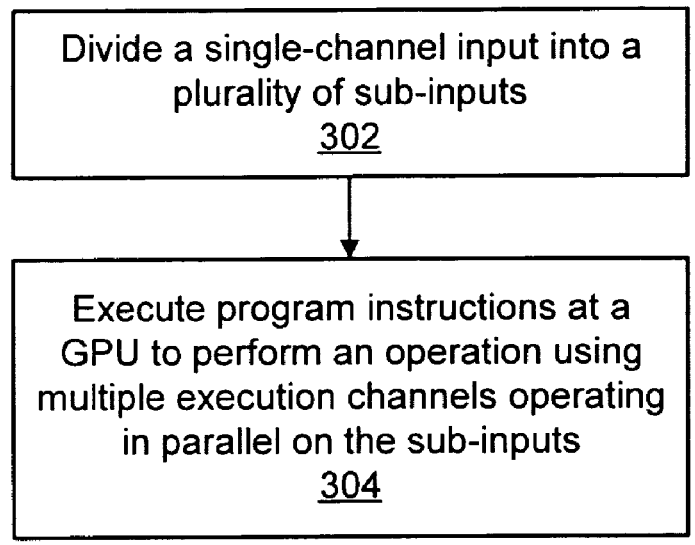
FIG. 3 is a flow diagram illustrating a method for performing an operation on single-channel input using multiple execution channels of a GPU according to one embodiment.

FIG. 3 is a flow diagram illustrating a method for performing an operation on single-channel input using multiple execution channels 114A-114N of a GPU 110 according to one embodiment. As shown in block 302, a single-channel input 122 (e.g., for a single-channel operation) may be divided into a plurality of sub-inputs. Each of the plurality of sub-inputs may comprise a portion of the single-channel input 122. As shown in block 304, program instructions 117 may be executed on the GPU 110 to perform an operation on the plurality of sub-inputs. At least a subset of the program instructions 117 may be executed on each of the execution channels 114A-114N in parallel for a corresponding sub-input. In this manner, each of the plurality of sub-inputs may be processed in parallel using a GPU 110 comprising a plurality of execution channels 114A-114N.

Figure 4A:
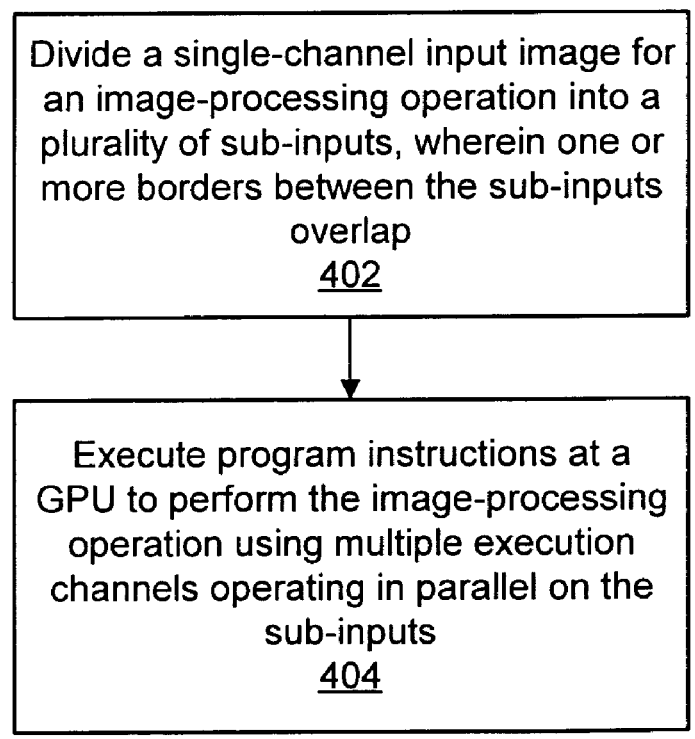
FIG. 4A is a flow diagram illustrating a method for performing a single-channel image-processing operation using border padding and multiple execution channels of a GPU according to one embodiment.

FIG. 4A is a flow diagram illustrating a method for performing a single-channel image-processing operation using border padding and multiple execution channels 114A-114N of a GPU 110 according to one embodiment. As shown in block 402, a single-channel input image for an image-processing operation may be divided into a plurality of sub-inputs. Each of the plurality of sub-inputs may comprise a portion of the single-channel input image. For example, the input image may be divided into a plurality of rectangular sub-images. One or more borders of the sub-inputs may overlap. For example, a border of a first sub-input may comprise data that duplicates data (e.g., pixel information) on an adjacent border of a second sub-input. Additionally, another border of the first sub-input may overlap a border of a third sub-input, another border of the third sub-input may overlap a border of a fourth sub-input, and another border of the second sub-input may overlap another border of the fourth sub-input. The padding of borders may be used in conjunction with image operations in which the value of a pixel is dependent on the values of adjacent pixels. One embodiment of an input using padded borders is further illustrated in FIG. 8A.

As shown in block 404, program instructions 117 may be executed on the GPU 110 to perform the image-processing operation on the plurality of sub-inputs. At least a subset of the program instructions 117 may be executed on each of the execution channels 114A-114N in parallel for a corresponding sub-input. In this manner, each portion of the single-channel input image may be processed in parallel using a GPU 110 comprising a plurality of execution channels 114A-114N.

Figure 4B:
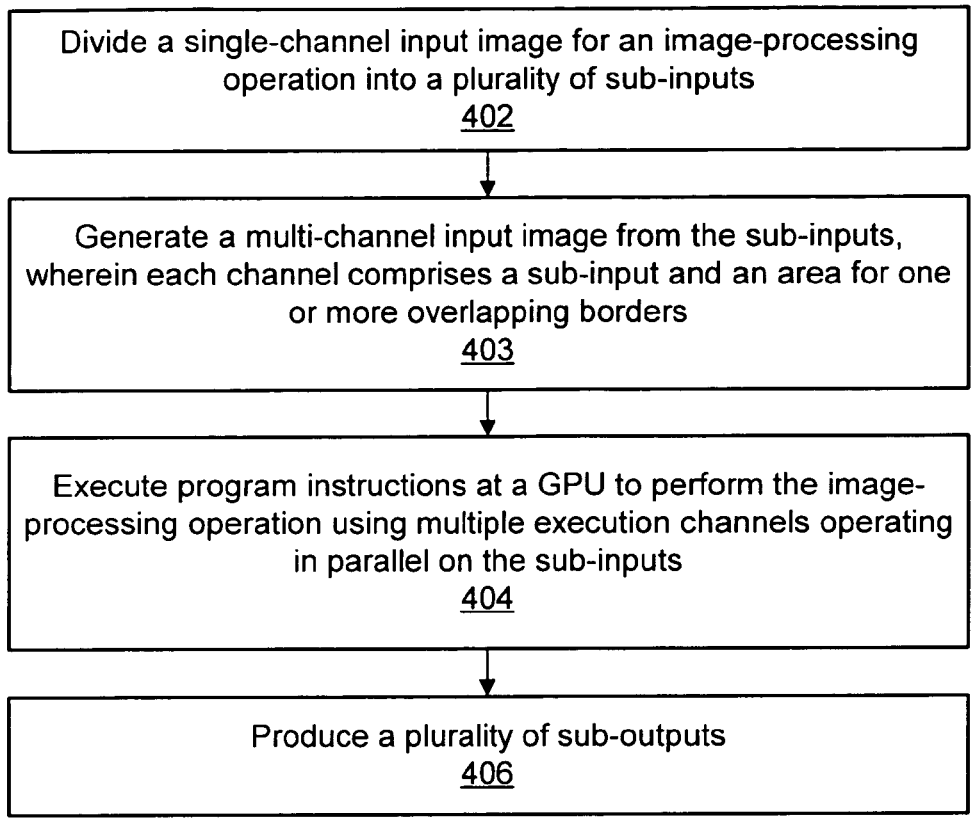
FIG. 4B is a flow diagram illustrating further aspects of a method for performing a single-channel image-processing operation using border padding and multiple execution channels of a GPU according to one embodiment.

FIG. 4B is a flow diagram illustrating further aspects of a method for performing a single-channel image-processing operation using border padding and multiple execution channels 114A-114N of a GPU 110 according to one embodiment. As shown in block 402, a single-channel input image for an image-processing operation may be divided into a plurality of sub-inputs (e.g., sub-images). In one embodiment, the GPU 110 may be configured to receive a multi-channel input to utilize the plurality of execution channels 114A-114N. As shown in block 403, a multi-channel input may be generated, where the multi-channel input comprises each of the plurality of sub-inputs in a respective channel of the multi-channel input. Each of the channels may comprise an area for optionally storing one or more overlapping borders. For example, each of the channels may be extended along the right edge (by a first amount) and the bottom edge (by a second amount) to provide sufficient "padding" to store overlapping borders. Overlapping borders may be stored in some but not all of the channels. Techniques for generating the multi-channel input image are further discussed with reference to FIGS. 8A and 8B.

As shown in block 404, program instructions 117 may be executed on the GPU 110 to perform the image-processing operation on the plurality of sub-inputs. At least a subset of the program instructions 117 may be executed on each of the execution channels 114A-114N in parallel for a corresponding sub-input. Each channel of the multi-channel input may be assigned to a corresponding one of the plurality of execution channels. In this manner, each portion of the single-channel input image may be processed in parallel using a GPU 110 comprising a plurality of execution channels 114A-114N. As shown in block 406, a plurality of sub-outputs may be produced as a result of the operation. Each of the sub-outputs may correspond to one of the sub-inputs. In one embodiment, the sub-outputs may be combined to produce a final single-channel output image having the same height and the same width as the single-channel input image.

Figure 5:
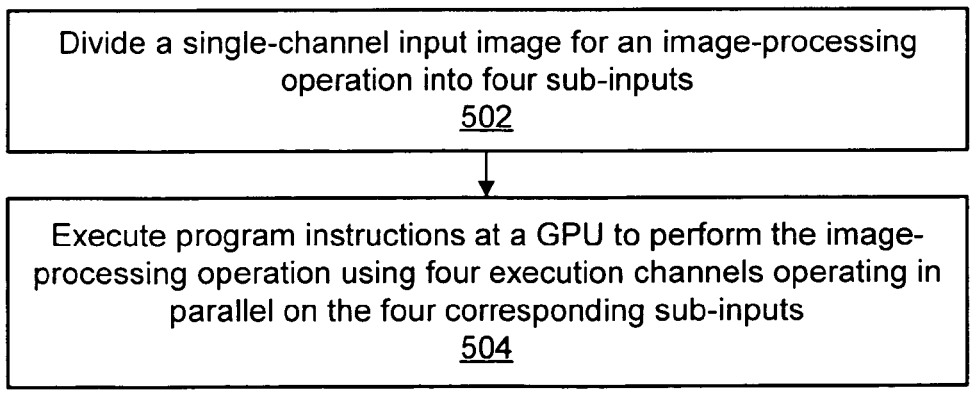
FIG. 5 is a flow diagram illustrating a method for performing an operation on single-channel input using four execution channels of a GPU according to one embodiment.

FIG. 5 is a flow diagram illustrating a method for performing an operation on single-channel input using four execution channels 114A-114N of a GPU 110 according to one embodiment. As shown in block 502, a single-channel input 122 (e.g., for a single-channel image-processing operation), such as a single-channel input image, may be divided into four sub-inputs 123A-123D. Each of the four sub-inputs 123A 123D may comprise a portion of the single-channel input 122. As shown in block 504, program instructions 117 may be executed on the GPU 110 to perform an operation on the four sub-inputs 123A-123D. At least a subset of the program instructions 117 may be executed on each of the four execution channels 114A-114D in parallel for a corresponding sub-input. In this manner, each of the four sub-inputs 123A-123D may be processed in parallel using a GPU 110 comprising four execution channels 114A-114D.

In various embodiments, the blocks shown in FIGS. 3, 4A, 4B, and 5 may be performed in a different order than the illustrated order. In FIGS. 3, 4A, 4B, and 5, any of the steps may be performed programmatically (i.e., by a computer according to a computer program). In FIGS. 3, 4A, 4B, and 5, any of the steps may be performed automatically (i.e., without user intervention).

In various embodiments, various approaches may be used in dividing the input into a plurality of sub-inputs. FIG. 6 is a block diagram illustrating an embodiment in which the single-channel input 122 is divided into discontinuous portions. For example, if the input 122 includes graphical input such as a rectangular image, then the input 122 may be divided by assigning each fourth pixel to one of four sub-inputs 123A-123D. Alternatively, contiguous units of more than one pixel (e.g., tiles) may be distributed to each of the four sub-inputs 123A-123D, where the number of units is a multiple of the number of execution channels (e.g., four). Other alternatives may include assigning scanlines or columns of pixels to particular sub-inputs. In this way, each of the four sub-inputs 123A-123D may include approximately one-fourth of the pixels in the input 122.

FIG. 7 is a block diagram illustrating an embodiment in which the single-channel input 122 is divided into contiguous blocks. For example, if the input 122 includes graphical input such as a rectangular image, then the input 122 may be divided into four sub-inputs 123A-123D of roughly equal size. Each of the four sub-inputs 123A-123D may comprise a rectangular image block or sub-image comprising a plurality of contiguous pixels.

The type of operation performed by the GPU 110 may influence the approach used in dividing the input 122 into a plurality of sub-inputs. For example, for operations in which the value of a pixel is not dependent on the value of surrounding pixels, then a pixel-by-pixel approach as shown in FIG. 6 may be desirable. However, for an operation in which individual pixels are dependent on their neighbors, then larger units (e.g., as shown in FIG. 7) may be desirable. In one embodiment, limitations of the GPU 110 may influence the approach used in dividing the input 122 into a plurality of sub-inputs. For example, if the size of a quadrant of the input image 122 (as shown in FIG. 7) is greater than the maximum size of a rectangular image block capable of being processed by the GPU 110, then the input image 122 may be divided into a plurality of tiles (less than or equal to the maximum size) as shown in FIG. 6. The number of tiles may be a multiple of the number of execution channels (e.g., a multiple of four).

Figure 8A:
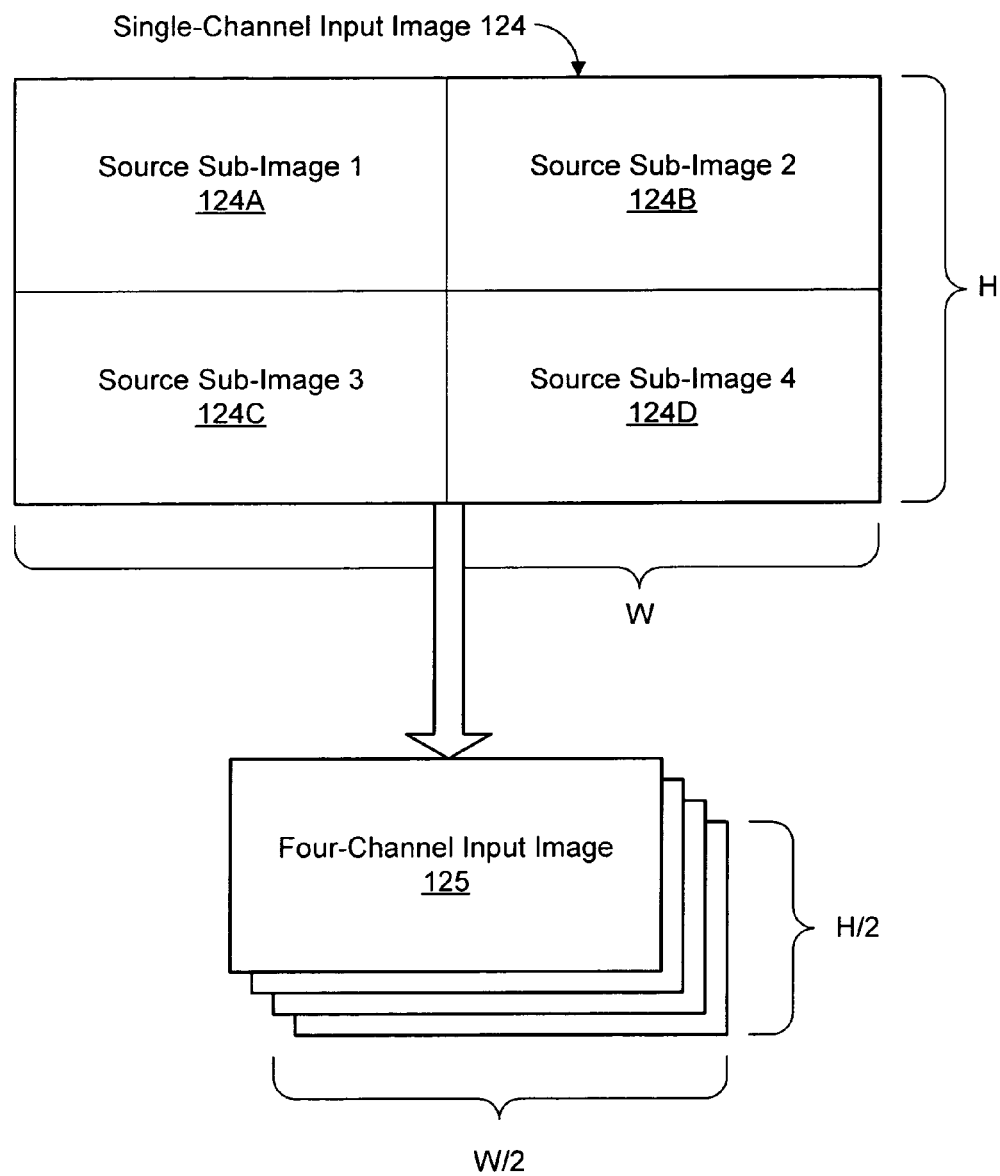
FIG. 8A is a block diagram illustrating an embodiment in which the single-channel input is constructed as a multi-channel input.

In one embodiment, the GPU 110 may be configured to receive a multi-channel input to utilize the plurality of execution channels 114A-114N. Thus, as discussed with reference to block 403 of FIG. 4B, a multi-channel input may be generated based on the sub-inputs. FIG. 8A is a block diagram illustrating an embodiment in which a single-channel input 124 is constructed as a multi-channel input. For purposes of example, a four-channel input image 125 is constructed in FIG. 8A, but other types of input and numbers of channels are possible and contemplated. The four-channel input image 125 may also be referred to as an interleaved image. Construction of the four-channel input image 125 may also be referred to as overlaying the single-channel input image 124.

The input may be provided originally as a single-channel image 124. As discussed above, the single-channel image may be divided into four source sub-images 124A-124D. A four-channel input image 125 may be constructed by copying each of the four source sub-images 124A-124D to one of the four channels of the four-channel input image 125. In one embodiment, the top-left quadrant 124A may be copied as the first channel of the four-channel input image 125, the top-right quadrant 124B may be copied as the second channel, the bottom-left quadrant 124C may be copied as the third channel, and the bottom-right quadrant 124D may be copied as the fourth channel. Although the source sub-images 124A-124D are illustrated as quadrants in FIG. 8A, a four-channel input image 125 may also be generated using finer-grained sub-inputs as discussed with reference to FIG. 6. In one embodiment, if the single-channel input image 124 has a height "H" and a width "W," then the four-channel input image 125 may have a height of H/2 and a width of W/2. Each of the four source sub-images 124A-124D may also have a height of H/2 and a width of W/2. In various embodiments, the construction of the four-channel input image 125 may be performed at the data source 120, at the GPU 110 (e.g., using program code 117), or at an intermediate component.

Figure 8B:
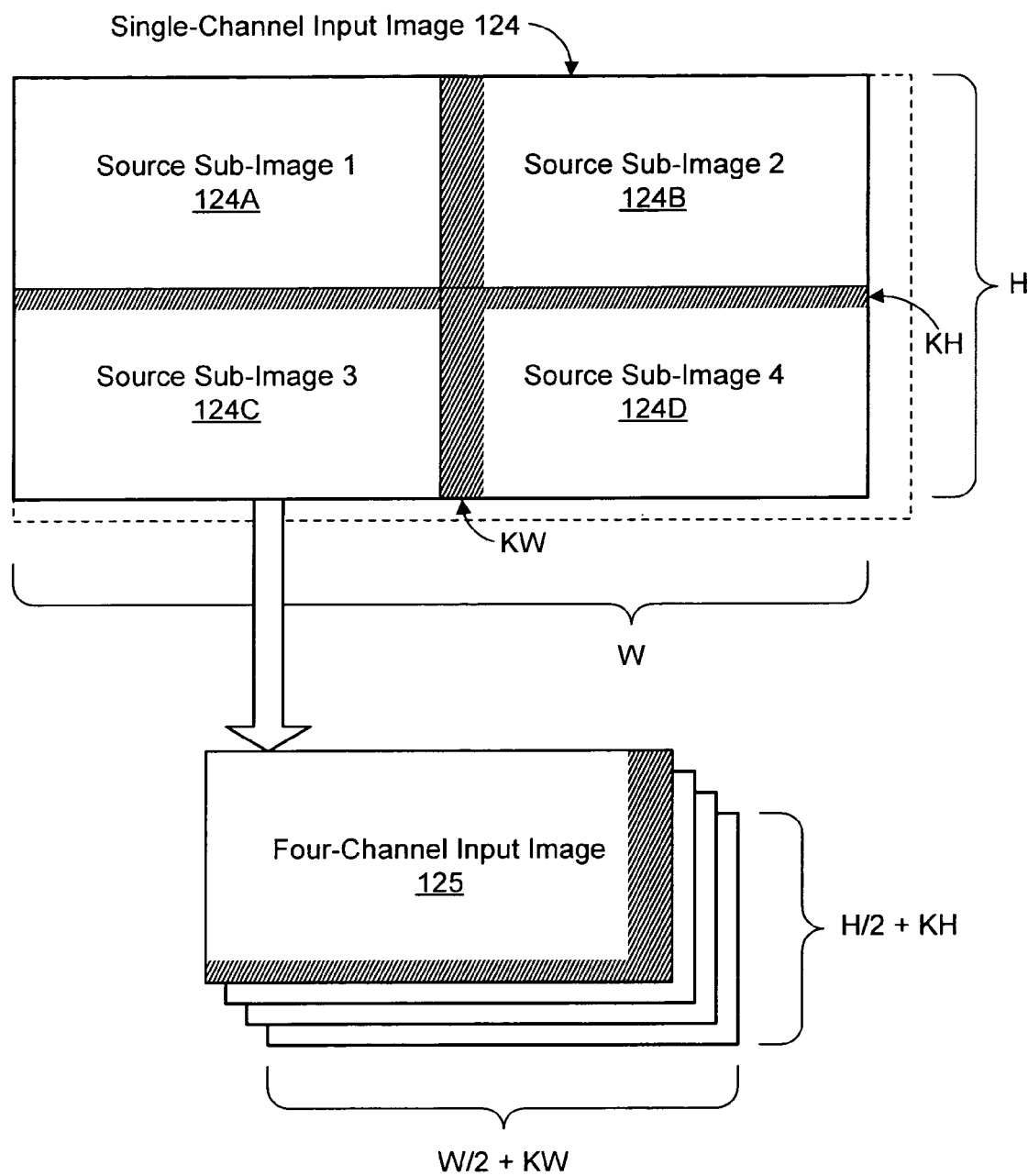
FIG. 8B is a block diagram illustrating another embodiment in which the single-channel input is constructed as a multi-channel input.

FIG. 8B is a block diagram illustrating another embodiment in which the single-channel input 124 is constructed as a multi-channel input. For purposes of example, a four-channel input image 125 is constructed in FIG. 8B, but other types of input and numbers of channels are possible and contemplated. In some image-processing operations, the value of a pixel may depend on the values of neighboring pixels. For pixels in a source sub-image which are located at or near the border of another source sub-image, the image-processing operation may need access to pixels from these adjacent sub-images. In these circumstances, the area of the source sub-images 124A-124D may be extended in the four-channel input image 125 to include a sufficient number of neighboring pixels from adjacent sub-images. The extended area may also be referred to herein as a padded border or overlapping border. In this manner, the image-processing operation may be properly performed on each individual sub-image.

As shown in FIG. 8B, the single-channel input image 124 has a height "H" and a width "W." In one embodiment, the image-processing operation has an operating neighborhood of height KH and width KW. For example, the value K may represent the kernel size of a convolution operation. In one embodiment, the size of each source sub-image may be extended by KH horizontally and KW vertically such that the respective channel in the four-channel input image 125 encompasses sufficient adjacent pixels to perform the operation. In one embodiment, the KH area below each source sub-image and the KW area to the right of each source sub-image may be added to the appropriate channel for the respective source sub-image in the four-channel input image 125. In this manner, some pixels from the single-channel input image 124 may be duplicated in the four-channel input image 125. In the case of source sub-images for which the KH and/or KW areas extend beyond the boundaries of the original image 124 (e.g., source sub-images 124B-124D), the appropriate pixels in the four-channel input image 125 may be left untouched. FIG. 8B displays the KH and KW extended areas which are internal to the single-channel input image 124 as shaded areas. Accordingly, the four-channel input image 125 may have a height of H/2+KH and a width of W/2+KW. Each individual channel in the four-channel input image 125 may also have a height of H/2+KH and a width of W/2+KW.

In one embodiment, the source sub-image 124A with a top-left coordinate of (0, 0) may be copied as the first channel of the four-channel input image 125. In one embodiment, the source sub-image 124B with a top-left coordinate of (W/2+1, 0) may be copied as the second channel. In one embodiment, the source sub-image 124C with a top-left coordinate of (0, H/2+1) may be copied as the third channel. In one embodiment, the source sub-image 124D with a top-left coordinate of (W/2+1, H/2+1) may be copied as the fourth channel.

In one embodiment, the pixel shader or other program code 117 may be configured to access data from any of the plurality of channels of the multi-channel input image 125. For pixel shaders that have such a capability, the multi-channel input image 125 may not include the KW and KH extended areas for operations requiring access to neighboring pixel information. Instead, the pixel shader may address the neighboring pixel information from one channel while performing the image-processing operation with respect to another channel.

The multi-channel input 125 may be provided to the GPU 110 for performing the single-channel operation using a plurality of execution channels. The GPU 110 may produce a multi-channel output as a result of the operation. In one embodiment, a single-channel output may be generated from the multi-channel output by applying an inverse of the transformation discussed with reference to FIGS. 6, 7, 8A, and 8B. For example, four sub-image quadrants in four channels of a four-channel output may be copied to four quadrants of a single-channel image having approximately four times the area of the four-channel output. In various embodiments, the transformation of the multi-channel output to a single-channel output may be performed at the data target 130, at the GPU 110 (e.g., using program code 117), or at an intermediate component. In some embodiments, the multi-channel output may not be transformed to a single-channel output if other results of the operation are of greater interest than a resulting image (e.g., finding a statistic in an image).

FIG. 9 is a block diagram illustrating constituent elements of a computer system 900 which is configured to implement embodiments of the techniques disclosed herein for performing an operation on a single-channel input using multiple execution channels of a GPU 110. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows™ from Microsoft Corporation, MacOS™ from Apple Corporation, or any other operating system that enables the operation of software on a hardware platform. The processor(s) 910 may be coupled to one or more of the other illustrated components, such as a memory 920, by at least one communications bus.

In one embodiment, the GPU 110 may be included in a specialized graphics card or other graphics component 956 which is coupled to the processor(s) 910. Additionally, the computer system 900 may include one or more displays 952. In one embodiment, the display(s) 952 may be coupled to the graphics card 956 for display of data provided by the graphics card 956.

Program instructions 940 that may be executable to implement the techniques described herein may be partly or fully resident within the memory 920 at the computer system 900 at any point in time. As is described with reference to FIG. 2, the program instructions 940 may be provided to the GPU 110 for performing operations on single-channel input data using multiple execution channels of the GPU 110. The memory 920 may be implemented using any appropriate medium such as any of various types of ROM or RAM (e.g., DRAM, SDRAM, RDRAM, SRAM, etc.), or combinations thereof. The program instructions 940 may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions 940 may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 9, as illustrated by the ellipsis shown.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
dividing single-channel, non-vectorized, graphical data into a plurality of sub-inputs, wherein each of the plurality of sub-inputs comprises a portion of the single-channel graphical data, and wherein a border of a first sub-input of the plurality of sub-inputs overlaps a border of a second sub-input of the plurality of sub-inputs; and
executing program instructions at a single graphics processing unit (GPU) to perform an image-processing operation, wherein the single GPU comprises a plurality of execution channels configured to operate on multi-channel vectorized graphical data such that each execution channel operates in parallel with the other execution channels on a different channel of the multi-channel vectorized graphical data, and wherein at least a subset of the program instructions are executed on each of the plurality of execution channels in parallel for a corresponding one of the plurality of sub-inputs such that each execution channel operates in parallel with the other execution channels on a different sub-input of the single-channel, non-vectorized, graphical data instead of operating on multi-channel vectorized graphical data.

2. The method as recited in claim 1, further comprising:
generating a multi-channel input comprising each of the plurality of sub-inputs in a respective channel of the multi-channel input.

3. The method as recited in claim 1, wherein another border of the first sub-input overlaps a border of a third sub-input of the plurality of sub-inputs, wherein another border of the third sub-input overlaps a border of a fourth sub-input of the plurality of sub-inputs, and wherein another border of the second sub-input overlaps another border of the fourth sub-input.

4. The method as recited in claim 1, wherein each of the plurality of sub-inputs comprises a rectangular sub-image.

5. The method as recited in claim 4, wherein a number of the rectangular sub-images is a multiple of a number of the execution channels.

6. The method as recited in claim 1, wherein the plurality of sub-inputs comprise four sub-inputs, and wherein the plurality of execution channels comprise four execution channels.

7. The method as recited in claim 6, wherein the four sub-inputs comprise quadrants of the single-channel input image.

8. The method as recited in claim 7, wherein each channel of a multi-channel input image comprises a respective one of the quadrants of the single-channel input image and an additional area for storing one or more overlapping borders of the quadrants.

9. The method as recited in claim 1, wherein the program instructions comprise a pixel shader, and wherein the pixel shader is executable to determine a value of a pixel in each of the plurality of execution channels in parallel.

10. The method as recited in claim 1, further comprising: generating a plurality of sub-outputs resulting from the image-processing operation.

11. The method as recited in claim 10, further comprising: combining the plurality of sub-outputs into a single-channel output image having a same height and a same width as the single-channel input image.

12. The method as recited in claim 11, further comprising: displaying the single-channel output image on a display device.

13. A system, comprising:
a particular graphics processing unit (GPU) comprising a plurality of execution channels configured to operate on multi-channel vectorized graphical data such that each execution channel operates in parallel with the other execution channels on a different channel of the multi-channel vectorized graphical data; and
memory coupled to the particular GPU, wherein the memory is configured to store program instructions executable by the particular GPU to perform an image-processing operation on a plurality of sub-inputs in parallel, wherein each of the plurality of sub-inputs is processed by a corresponding one of the plurality of execution channels such that each execution channel operates in parallel with the other execution channels on a different sub-input of single-channel, non-vectorized, graphical data instead of operating on multi-channel vectorized graphical data, wherein each of the plurality of sub-inputs comprises a portion of the single-channel, non-vectorized, graphical data input image, and wherein a border of a first sub-input of the plurality of sub-inputs overlaps a border of a second sub-input of the plurality of sub-inputs.

14. The system as recited in claim 13, further comprising:
at least one central processing unit (CPU); and
additional memory coupled to the at least one CPU, wherein the additional memory is configured to store additional program instructions executable by the at least one CPU to:
divide the single-channel input image into the plurality of sub-inputs;
add one or more overlapping borders to the plurality of sub-inputs; and
send the plurality of sub-inputs to the GPU.

15. The system as recited in claim 14, wherein the additional program instructions are further executable by the at least one CPU to:
generate a multi-channel input comprising each of the plurality of sub-inputs in a respective channel of the multi-channel input;
wherein in sending the plurality of sub-inputs to the GPU, the additional program instructions are further executable by the at least one CPU to send the multi-channel input to the GPU.

16. The system as recited in claim 13, wherein another border of the first sub-input overlaps a border of a third sub-input of the plurality of sub-inputs, wherein another border of the third sub-input overlaps a border of a fourth sub-input of the plurality of sub-inputs, and wherein another border of the second sub-input overlaps another border of the fourth sub-input.

17. The system as recited in claim 13, wherein each of the plurality of sub-inputs comprises a rectangular sub-image.

18. The system as recited in claim 13, wherein the plurality of sub-inputs comprise four sub-inputs, and wherein the plurality of execution channels comprise four execution channels.

19. The system as recited in claim 18, wherein the four sub-inputs comprise quadrants of the single-channel input image.

20. The system as recited in claim 19, wherein each channel of a multi-channel input image comprises a respective one of the quadrants of the single-channel input image and an additional area for storing one or more overlapping borders of the quadrants.

21. The system as recited in claim 13, wherein the program instructions comprise a pixel shader, and wherein the pixel shader is executable by the GPU to determine a value of a pixel in each of the plurality of execution channels in parallel.

22. The system as recited in claim 13, wherein in performing the image-processing operation on the plurality of sub-inputs in parallel, the program instructions are further executable by the GPU to generate a plurality of sub-outputs.

23. A computer-readable storage medium, comprising program instructions, wherein the program instructions are computer-executable to implement:
dividing single-channel, non-vectorized, graphical data into a plurality of sub-inputs, wherein each of the plurality of sub-inputs comprises a portion of the single-channel graphical data, and wherein a border of a first sub-input of the plurality of sub-inputs overlaps a border of a second sub-input of the plurality of sub-inputs; and
performing an image-processing operation at a single graphics processing unit (GPU), wherein the single GPU comprises a plurality of execution channels configured to operate on multi-channel vectorized graphical data such that each execution channel operates in parallel with the other execution channels on a different channel of the multi-channel vectorized graphical data, and wherein at least a subset of the image-processing operation is performed on each of the plurality of execution channels in parallel for a corresponding one of the plurality of sub-inputs such that each execution channel operates in parallel with the other execution channels on a different sub-input of the single-channel, non-vectorized, graphical data instead of operating on multi-channel vectorized graphical data.

24. The computer-readable storage medium as recited in claim 23, wherein the program instructions are further computer-executable to implement:
generating a multi-channel input comprising each of the plurality of sub-inputs in a respective channel of the multi-channel input.

25. The computer-readable storage medium as recited in claim 23, wherein another border of the first sub-input overlaps a border of a third sub-input of the plurality of sub-inputs, wherein another border of the third sub-input overlaps a border of a fourth sub-input of the plurality of sub-inputs, and wherein another border of the second sub-input overlaps another border of the fourth sub-input.

26. The computer-readable storage medium as recited in claim 23, wherein each of the plurality of sub-inputs comprises a rectangular sub-image.

27. The computer-readable storage medium as recited in claim 23, wherein the plurality of sub-inputs comprise four quadrants of the single-channel input image, and wherein each channel of a multi-channel input image comprises a respective one of the quadrants of the single-channel input image and an additional area for storing one or more overlapping borders of the quadrants.

28. The computer-readable storage medium as recited in claim 23, wherein the program instructions are further computer-executable to implement:

generating a plurality of sub-outputs resulting from the image-processing operation.

29. The computer-readable storage medium as recited in claim 28, wherein the program instructions are further computer-executable to implement:

combining the plurality of sub-outputs into a single-channel output image having a same height and a same width as the single-channel input image.

* * * * *